(No Model.)
E. A. EGGERT.
SCREW DRIVER.
No. 515,327. Patented Feb. 27, 1894.
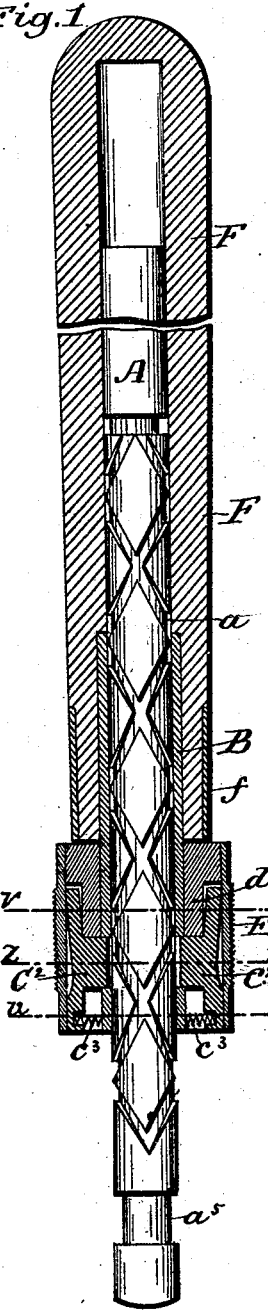
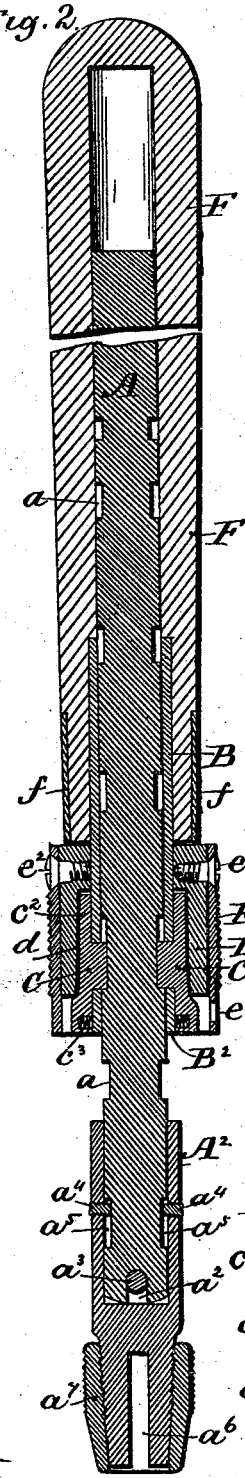
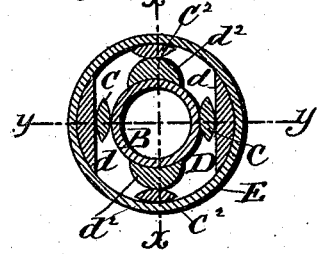
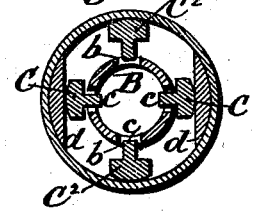
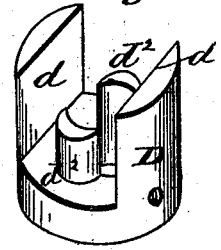
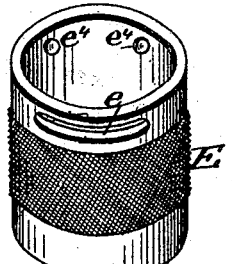
WITNESSES
INVENTOR
Edward A. Eggert
by E. E. Masson, Attorney.

UNITED STATES PATENT OFFICE.

EDWARD A. EGGERT, OF BUFFALO, NEW YORK.

SCREW-DRIVER.

SPECIFICATION forming part of Letters Patent No. 515,327, dated February 27, 1894.

Application filed April 13, 1893. Serial No. 470,142. (No model.)

*To all whom it may concern:*

Be it known that I, EDWARD A. EGGERT, a citizen of the United States, residing at Buffalo, in the county of Erie, State of New York, have invented certain new and useful Improvements in Screw-Drivers, of which the following is a specification, reference being had therein to the accompanying drawings.

This invention relates to spiral tool drivers in which a rotary motion of the spindle is obtained by pushing the handle thereof; and the objects of my improvement are to simplify the construction and reduce the cost of the screw driver represented and described in Patent No. 452,772, of May 26, 1891. I attain these objects by the construction illustrated in the accompanying drawings in which—

Figure 1 is a longitudinal section of a tool driver constructed in accordance with my invention said section being taken on line $x\,x$ of Fig. 3. Fig. 2 is a longitudinal section of the same taken on line $y\,y$ of Fig. 3. Fig. 3 is a transverse section on line $v\,v$ of Fig. 1. Fig. 4 is a transverse section on line $z\,z$ of Fig. 1. Fig. 5 is a perspective view of the jaw-operating cam. Fig. 6 is a perspective view of the sleeve used to carry the jaw-operating cam. Fig. 7 is a transverse section on line $u\,u$ of Fig. 1. Fig. 8 is a perspective view of one of the jaws. Figs. 5 and 6 represent the parts upside down relatively to the position they occupy in Figs. 1 and 2.

In said drawings A represents the spindle of the screw-driver, or tool-driver. It is provided with helical grooves $a$ running in opposite directions upon its surface, and in its lower end there is a groove $a^2$ diametrically therethrough for engagement with a pin $a^3$ secured diametrically across the bottom of a cavity in the upper end of a tool-holder $A^2$. Said tool-holder is additionally connected with the spindle A by means of two small screws $a^4$ passing through the walls of the tool-holder and having their points received in a groove $a^5$ formed in the periphery of the spindle A. The lower end of the tool-holder is longitudinally slotted at $a^6$, to form tool-holding jaws, that are partly forced toward each other by an annular nut $a^7$ to clamp said jaws and the tool that may be placed between them. The spindle is loosely fitted within the interior of a tube B, the inner end of which extends a suitable distance, preferably nearly one fourth of the whole length of the wood-handle F, the latter being forced tightly upon the tube after it has received the jaw operating cam D of the instrument. Said cam is loosely retained between a broad collar $B^2$ secured upon the outer end of the tube B or formed integral therewith, and the inner end of the handle F. To strengthen said inner end it is provided with a broad ferrule $f$.

To rotate the spindle A, while the tool at its lower end is resting upon an object, by simply pushing upon the handle F of the device, two pairs of jaws C and $C^2$ have their outer ends received in four radial mortises or grooves $B^3$ formed in the collar $B^2$ of the tube B. Each jaw is provided with a rib or feather $c$, projecting diagonally across its inner face, said rib being inclined in one direction upon the jaws C and in the opposite direction on the jaws $C^2$, so that when the pair C is in engagement with the spindle and the latter is pushed upon lengthwise, said jaws will rotate said spindle in one direction; but when the pair $C^2$ is in engagement, it will rotate the spindle in the opposite direction.

To retain the jaws C $C^2$ connected to the tube B, the latter has in its sides four grooves $b$ to receive the feathers $c$ of the jaws, one pair of said grooves being inclined in one direction, and the other pair being inclined in the opposite direction. Said grooves $b$ permit one pair of feathers $c$ to enter at one time one of the pairs of grooves in the spindle A.

To keep the feathers $c$ of either pair of jaws in engagement with the spindle, an annular cam D is placed upon the tube B between its collar $B^2$ and the inner end of the handle F. Said cam has two of its sides cut away to permit the admission of the jaws within their seats in the sides of the tube B and the other two sides have their inner faces $d$ cut parallel to each other, said faces being used to force the feathers of one pair of jaws in engagement with the grooves of the spindle A, as shown in Figs. 2, 3 and 4. The cam D has also formed in its interior, adjacent to its central perforation two crescent shaped projections $d^2$ to force one pair of jaws out of engagement with the spindle A, as shown in Figs. 1 and 3. The length of the projections $d^2$ being about half the length of the face $d$, said projections are easily made to pass over the end of the feathers $c$ and between the tail end $c^2$ of the jaws and the tube B. To retain the outer end of each jaw of a pair away from the inner side of the grooves $B^3$, each jaw is provided with a light coiled spring $c^3$ that has one end received in a small perforation in the inner side of said jaw.

To permit the operator to control the cam D so as to throw either the pair of jaws C or the pair of jaws $C^2$ in engagement with the spindle A, and also to prevent the jaws that are not in engagement from dropping out of their seats, said parts are inclosed in a sleeve E that is secured to the cam D by means of two screws $e^2$ passing into the periphery of said sleeve adjacent to its inner end.

To limit the extent of rotation of the sleeve E, and cam D to forty-five degrees said sleeve has a slot $e$ extended about forty-five degrees in its periphery adjacent to its outer end. Through said slot is made to pass a screw $e^3$ that has its inner end secured into the periphery of the stationary collar $B^2$ of the tube B. When said screw is at one end of the slot $e$ one pair of the jaws will be in engagement with one of the series of grooves in the spindle to rotate it to the right, as in driving a screw in material, and when the sleeve E is so rotated as to bring the screw $e^3$ into the opposite end of the slot $e$, the other pair of jaws will be in engagement with the other series of grooves in the spindle to rotate the latter toward the left, as for example to remove a screw from its cavity in a material. When the screw $e^3$ is half way between the ends of the groove $e$, both sets of jaws are out of engagement with the spindle and the latter can be entirely removed from the tube B. To frictionally retain the sleeve E in such a position, with the screw $e^3$ into either end of the slot $e$, the collar $B^2$ has in its periphery a latch or shouldered spring-bolt $b^2$ that rests upon, and partly within a small coil spring placed in a cavity of the collar $B^2$. Said bolt has a semi-spherical head that normally rests in either one of shallow semi-spherical cavities $e^4$ in the interior surface of the sleeve E.

Having now fully described my invention, I claim—

1. In a screw-driver, the combination of a helically-grooved spindle, its inclosing tube B having a collar $B^2$ provided with radial grooves $B^3$ in its periphery, two pairs of jaws having feathers passing through the walls of said tube and springs $c^3$ bearing against the inner side of each groove $B^3$ substantially as described.

2. In a screw-driver, the combination of the central spindle thereof, its inclosing tube having on its outer end a collar provided with radial grooves $B^3$ in its periphery, two pairs of jaws, each having a feather passing through the walls of said tube, and a cam D having on its inner side two flat faces $d$ and two crescent shaped projections $d^2$, whereby two of the jaws are forced into engagement with the spindle by said flat faces and two of the jaws are forced out of engagement with the spindle by the projections $d^2$ substantially as described.

3. In a screw-driver the combination of the central spindle A, its inclosing tube having on its outer end a collar provided with radial grooves $B^3$ in its periphery, two pairs of jaws, a cam D having the outer projections $d$ and inner projections $d^2$ to actuate the jaws, a sleeve E inclosing the jaws and cam and secured to the latter, said sleeve having a slot $e$ in its periphery adjacent to its outer end and a screw $e^3$ passing through said slot and into the collar $B^2$ substantially as described.

4. In a screw-driver the combination of the spindle A its inclosing tube having on its outer end a collar $B^2$ provided with radial grooves $B^3$ in its periphery, two pairs of jaws in said grooves each jaw having a feather $c$, and means as described to actuate said jaws, a sleeve inclosing the jaws and collar $B^2$ and having cavities $e^4$ in said sleeve and a spring bolt $b^2$ in said collar substantially as described.

In testimony whereof I affix my signature in presence of two witnesses.

EDWARD A. EGGERT.

Witnesses:
GEORGE R. VAUGHAN,
TOWNSEND W. CROSBY.